No. 721,491. PATENTED FEB. 24, 1903.
A. ANDERSON.
FRYING PAN.
APPLICATION FILED JULY 3, 1902.
NO MODEL. 2 SHEETS—SHEET 1.
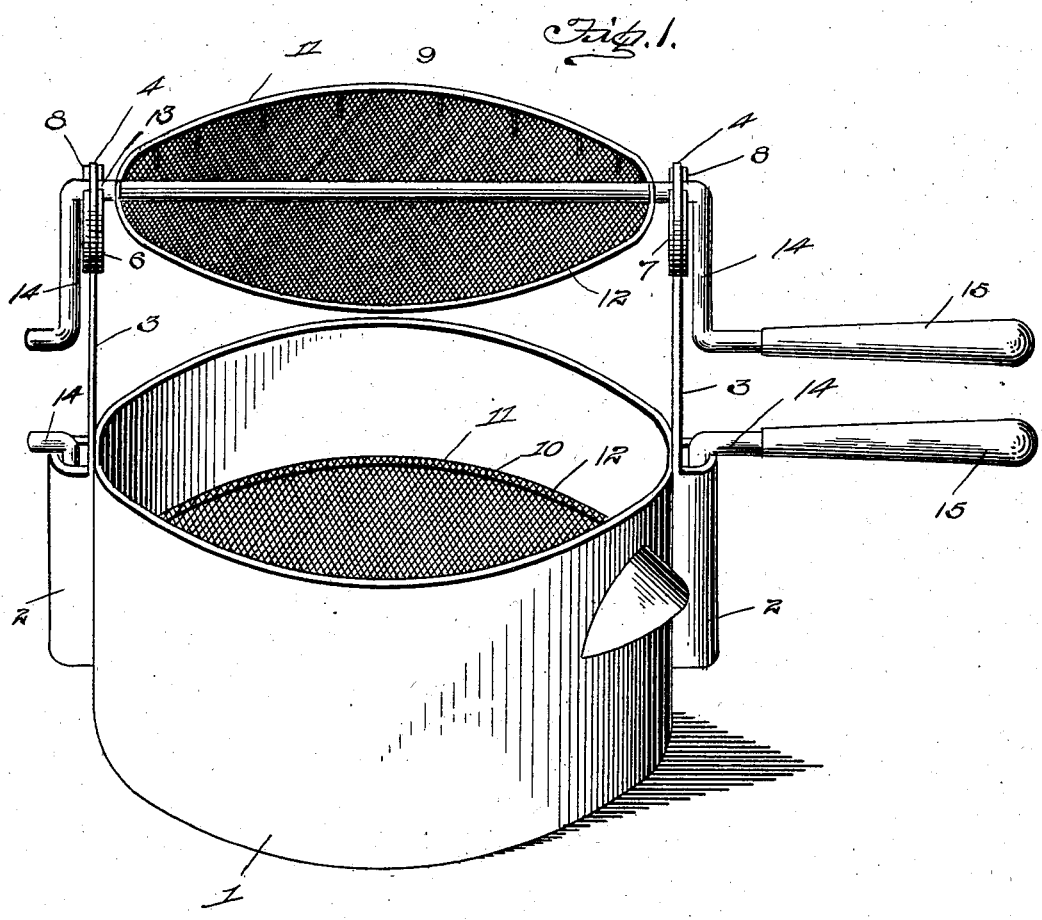
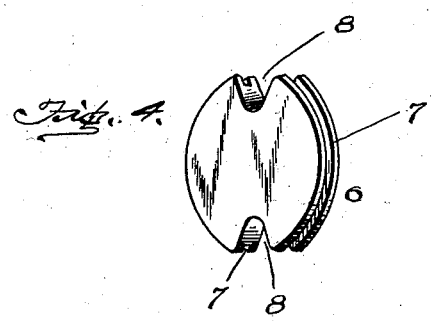
Inventor
Alfred Anderson.
Witnesses
By
Attorneys No. 721,491. PATENTED FEB. 24, 1903.
A. ANDERSON.
FRYING PAN.
APPLICATION FILED JULY 3, 1902.
NO MODEL. 2 SHEETS—SHEET 2.
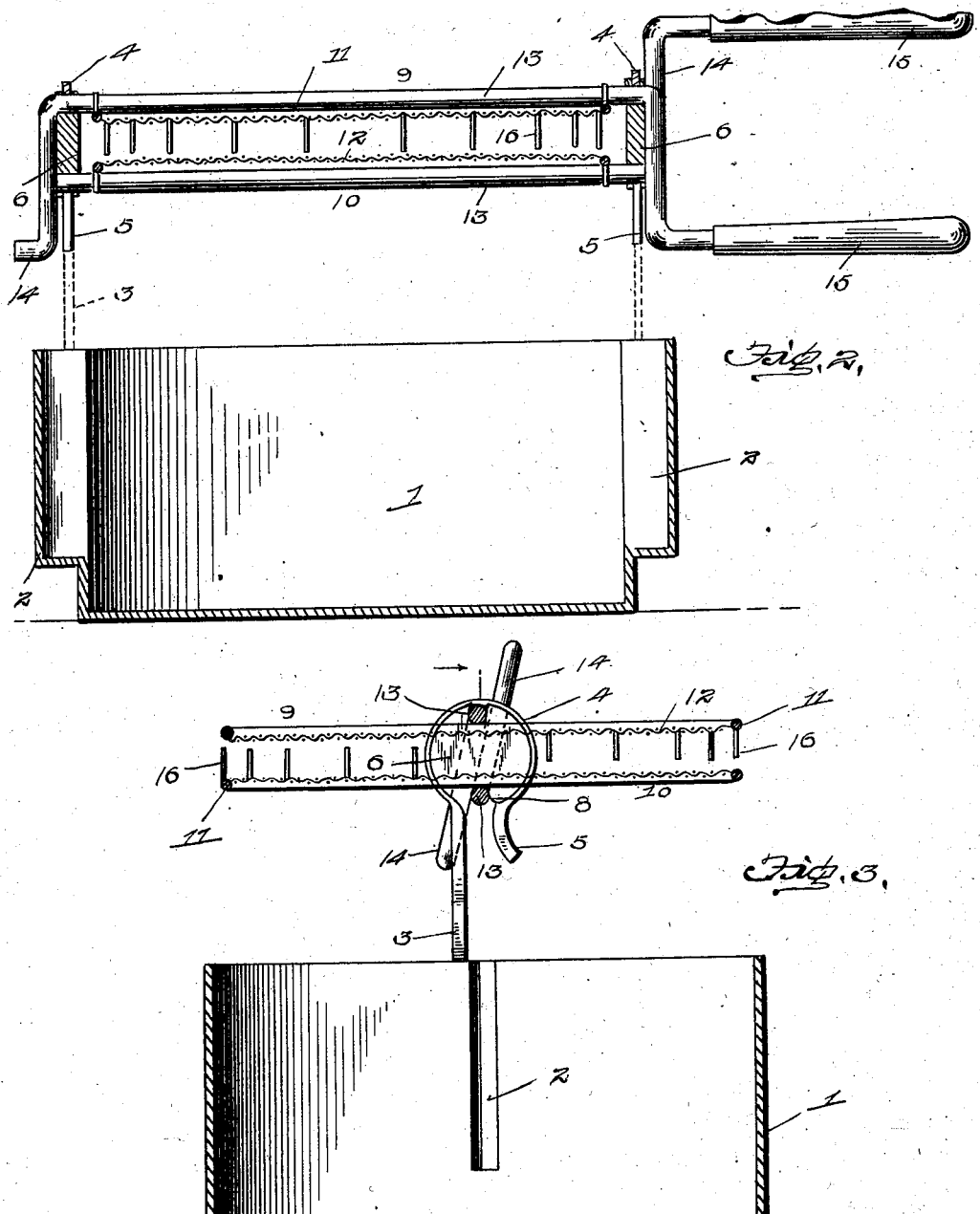

UNITED STATES PATENT OFFICE.

ALFRED ANDERSON, OF FRAZEE, MINNESOTA, ASSIGNOR TO THOS. J. ALLEN AND WM. F. RICK, OF FRAZEE, MINNESOTA.

FRYING-PAN.

SPECIFICATION forming part of Letters Patent No. 721,491, dated February 24, 1903.

Application filed July 3, 1902. Serial No. 114,247. (No model.)

*To all whom it may concern:*

Be it known that I, ALFRED ANDERSON, a citizen of the United States, residing at Frazee, in the county of Becker and State of Minnesota, have invented certain new and useful Improvements in Frying-Pans; and I do declare the following to be a full, clear, and exact description of the invention, such as will enable others skilled in the art to which it appertains to make and use the same.

The invention relates to frying-pans, and more particularly to pans designed for the frying of doughnuts.

The object of the invention is to provide a pan of this character with means whereby the doughnuts after browning upon one side may be all simultaneously turned and deposited into the boiling grease, thus avoiding the necessity of independently turning them and preventing injury to the hands by the splashing of the grease.

With this and other objects in view the invention consists of certain novel features of construction, combination, and arrangement of parts, which will be hereinafter more fully described, and particularly pointed out in the appended claims.

In the accompanying drawings, Figure 1 is a perspective view of my improved pan when in position for use. Fig. 2 is a vertical sectional view illustrating both trays in an elevated position. Fig. 3 is a similar view taken at right angles to Fig. 2, and Fig. 4 is a detail perspective view of one of the rotary heads.

Referring to the drawings, 1 denotes the body of the pan, which may be of any well-known or approved construction and which is preferably formed at diametrically opposite points in its circumference with grooves 2, which extend from the upper edge of the pan to a point a slight distance above the bottom thereof.

3 denotes standards which project upwardly from the sides of the pan at points adjacent to the grooves and are provided at their upper ends with journal-bearings 4 and with guide-arms 5. Each standard is preferably made of a bar of iron bent to form the journal-bearings 4 and is so represented in the drawings.

6 denotes rotary heads journaled in the bearings 4 and each preferably consisting of a disk the periphery of which is grooved, as shown at 7, to engage the journal-bearing and is provided with notches 8 at diametrically opposite points for a purpose hereinafter to be described.

9 and 10 denote the trays, which preferably consist each of a circular frame 11, to which is secured a screen 12. A rod 13 is secured to each tray and is provided with crank ends 14, a crank end of each rod being provided with a handle 15. One side of each tray for about half of its circumference is provided with guards 16 in the form of fingers. When the two trays are brought together or are in that position shown in Fig. 2 of the drawings, the guards of one tray and the guards of the other tray will produce a circular guard, so that in the swinging of the trays none of the doughnuts will fall from between the edges thereof.

The operation is as follows: Assuming the parts to be in the position shown in Fig. 1 of the drawings, in which position it will be presumed that the doughnuts are cooking in the pan, after the doughnuts have been browned upon one side the lowermost tray is elevated, thus elevating the doughnuts. The cranks of the lower tray are now engaged with the lowermost notches of the rotary heads, and when both handles of the trays are in such position as to be grasped said trays are turned, whereby the lowermost tray becomes the uppermost and the doughnuts supported thereby are deposited upon the other tray, which is now let down into the grease in the pan, so that the opposite sides of the doughnuts may be browned. The trays may be turned in either direction, and the guard-fingers thereof will prevent the doughnuts from slipping off the trays when they are being turned. After the doughnuts have been browned on both sides the submerged tray is elevated and withdrawn from the pan and the doughnuts allowed to drain, after which they may be slid off of the unobstructed side of the tray or that side not provided with guards. As soon as this tray has been removed from the pan another tray freshly charged with doughnuts may be inserted in the pan and the operation repeated, so that no time is lost while the thoroughly-cooked doughnuts are being drained.

A very important feature of the invention is that the doughnuts may be simultaneously turned, so that all the doughnuts will be uniformly cooked upon one side, which would not be the case were each doughnut individually turned, as is now the custom, for the reason that the last one reached in being turned would naturally be cooked to a greater extent than the first one.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination of a pan provided with journal-bearings, heads mounted to turn in said bearings, and independently-removable trays adapted to be moved toward each other to engage said heads and to be rotated with the same to reverse their positions, substantially as set forth.

2. The combination of a pan, standards secured thereto and provided with journal-bearings, rotary heads journaled in said bearings and provided with notches in their peripheries, trays having crank-arms adapted to engage said notches and be rotated with the heads to reverse their positions, substantially as set forth.

3. The combination with a pan and standards projecting upwardly therefrom and attached thereto, of journal-bearings provided at the upper ends of said standards and terminating in guide-arms, circumferentially-grooved heads mounted to rotate in said bearings and provided in their peripheries with diametrically opposite notches, and trays having cranks which are adapted to engage said notches and rotate with the heads, whereby the position of the trays may be reversed, substantially as set forth.

In testimony whereof I have hereunto set my hand in presence of two subscribing witnesses.

ALFRED ANDERSON.

Witnesses:
CHAS. H. BLANDING,
O. P. MORTON.